(12) United States Patent
Palm et al.

(10) Patent No.: US 9,445,304 B2
(45) Date of Patent: Sep. 13, 2016

(54) INVERSE SERVICE SPECIFIC ACCESS CONTROL (SSAC)

(71) Applicant: Telefonaktiebolaget L M Ericsson (publ), Stockholm (SE)

(72) Inventors: Håkan Palm, Växjö (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 14/461,591

(22) Filed: Aug. 18, 2014

(65) Prior Publication Data

US 2015/0049608 A1 Feb. 19, 2015

Related U.S. Application Data

(60) Provisional application No. 61/867,312, filed on Aug. 19, 2013.

(51) Int. Cl.
| | |
|---|---|
| *H04W 48/02* | (2009.01) |
| *H04W 28/02* | (2009.01) |
| *H04W 76/02* | (2009.01) |
| *H04M 7/00* | (2006.01) |
| *H04W 48/20* | (2009.01) |

(52) U.S. Cl.
CPC ....... *H04W 28/0289* (2013.01); *H04M 7/0066* (2013.01); *H04W 48/20* (2013.01); *H04W 76/02* (2013.01)

(58) Field of Classification Search
None
See application file for complete search history.

(56) References Cited

U.S. PATENT DOCUMENTS

| | | | | |
|---|---|---|---|---|
| 2012/0244853 | A1* | 9/2012 | Iwamura | H04W 48/02 455/422.1 |
| 2014/0315548 | A1* | 10/2014 | Ramachandran | H04W 48/16 455/434 |
| 2015/0111556 | A1* | 4/2015 | Hapsari | H04W 8/22 455/418 |

FOREIGN PATENT DOCUMENTS

WO WO 2013/093192 A1 6/2013

OTHER PUBLICATIONS

3GPP TSG CT WG1 Meeting #73; St. Julians (Malta); Change Request, 24.301 CF 1208; rev 1; Current version 10.3.0; Title: Access class control for EUTRAN (C1-113437), Aug. 22-26, 2011.
3GPP TSG-RAN WG2 #68bis; Valencia, Spain; Title: Resolving open issues of SSAC; Source: NTT Docomo, Inc.; (Tdoc-R2-100592), Jan. 18-22, 2010.
3GPP TSG-RAN WG2 #83bis; Ljubljana, Slovenia; Source: LG Electronics, SK Telecom, LG Uplus; Title: SCM Solutions for Prioritization of Mobile Originating Voice Services in E-UTRAN (R2-133357), Oct. 7-10, 2013.
3GPP TSG-RAN WG2 #85; Prague, Czech Republic; Source: Ericsson; Title: Details of bypassing ACB solution for SCM (Tdoc R2-140638), Feb. 10-14, 2014.

(Continued)

*Primary Examiner* — Mohammad Adhami
(74) *Attorney, Agent, or Firm* — Baker Botts, LLP

(57) ABSTRACT

According to some embodiments, a wireless communication device is operable to perform a process for initiating a session with a radio network node. As a part of the process, the wireless communication device is operable to determine that the radio network node has enabled an access class barring test, determine whether to perform or bypass the access class barring test for the session, and perform or bypass the access class barring test according to the determination.

20 Claims, 7 Drawing Sheets

(56) References Cited

OTHER PUBLICATIONS

PCT Notification of Transmittal of the International Search Report and the Written Opinion of the International Searching Authority, or the Declaration for International application No. PCT/IB2014/063972, Jan. 23, 2015.
3GPP TS 22.011 V12.0.0; Technical Specification; 3rd Generation Partnership Project; Technical Specification Group Services and System Aspects; Service accessibility (Release 12), Mar. 2013.

\* cited by examiner

INVERSE SERVICE SPECIFIC ACCESS CONTROL (SSAC)

RELATED APPLICATIONS

This application claims the benefit of priority of U.S. Provisional Patent Application No. 61/867,312 filed on Aug. 19, 2013.

TECHNICAL FIELD

The present disclosure relates, in general, to wireless communications and, more particularly, to inverse service specific access control.

BACKGROUND

In a typical cellular radio system, wireless communication devices communicate via a Radio Access Network (RAN) to one or more core networks. The radio access network covers a geographical area that is divided into cell areas, with each cell area being served by a radio access node. A wireless communication device within the cell may communicate with the radio access node over the air interface.

Under certain circumstances, it may be necessary to use access control to control the load of the network. For example, access control may prevent at least some of the wireless communication devices from accessing the network for the purposes of (a) congestion control, (b) emergency situations, and (c) other special situations, such as Public Land Mobile Network (PLMN) failure. 3GPP TS 22.011, "Service Accessibility," describes a method of access control that varies the probability of wireless communication devices accessing the network.

As an example, an access control technique may assign each wireless communication device to one out of ten randomly allocated mobile populations, defined as Access Classes 0 to 9. The population number is stored in the Subscriber Identity Module (SIM)/Universal Subscriber Identity Module (USIM). In addition, wireless communication devices may be members of one or more of 5 special categories (Access Classes 11 to 15), also held in the SIM/USIM. These classes are allocated to specific high priority users.

Access Class Barring (ACB) is used to control the access attempts of wireless communication devices belonging to any of the above access classes. Especially, access of wireless communication devices in classes 0-9 can be limited, whereas wireless communication devices belonging to the special classes can be granted direct access overriding the ACB applied to the normal classes 0-9.

In UTRAN, for example, the existing ACB mechanism is based on a bitmap broadcasted by the network. The bitmap indicates which of classes from 0 to 9 are barred and which are not. For example, there is an Access Class Barred information element in specification 3GPP TS 25.331, "Radio Resource Control (RRC); Protocol Specification."

In E-UTRAN, the ACB mechanism is based on an access barring factor and an access barring time, both of which are broadcast in the system information when ACB is applicable. When ACB is used, wireless communication devices attempting access will make the barring check. First, the wireless communication device draws a uniform random number and compares it against the access barring factor to determine whether access is barred or not. A value lower than the access barring factor denotes that the wireless communication device is barred, otherwise access is allowed. If barred, the wireless communication device proceeds to determine the time the barring is applicable.

3GPP TS 22.011, "Service Accessibility," also describes Service Specific Access Control (SSAC) for MultiMedia TELephony service (MMTEL) functions. The purpose is to apply independent access control for telephony services (MMTEL-voice, MMTEL-video) for mobile originating session requests from idle-mode. For example, a service probability factor and mean duration of access control may be assigned for each of MMTEL voice and MMTEL video. Finally, Access Control for Circuit Switched Fall Back (CSFB) is defined.

Examples of procedures for establishing a voice call during ACB and SSAC are set forth in TS 36.331, "Evolved Universal Terrestrial Radio Access (E-UTRA); Radio Resource Control (RRC); Protocol Specification" and TS 24.173, "IMS Multimedia telephony communication service and supplementary services; Stage 3." In general, the RRC layer executes the ACB barring check whereas the Internet protocol Multimedia Subsystem (IMS) layer executes the SSAC barring. The procedure may include the following steps:

1. The wireless communication device reads ACB and SSAC parameters broadcast by the radio access node based on the normal System Information Acquisition procedure.

2. The IMS layer in the wireless communication device triggers a voice call. It requests the RRC layer to forward SSAC parameters to the IMS layer in the wireless communication device.

3. Upon request from the higher layer (i.e., the IMS layer), the RRC layer forwards SSAC parameters to the higher layer.

4. The IMS layer in the wireless communication device determines if the call is barred or not.

a. If the call is barred, the call establishment procedure stops.

b. If the call is not barred, a new call is generated. This can be seen as a new RRC connection establishment in the RRC layer. During RRC connection establishment, the wireless communication device checks ACB parameters. If the wireless communication device is barred according to ACB parameters, then it is not allowed to access the network.

As can be seen from the procedure above, the wireless communication device might be barred with ACB even though the access is allowed with the SSAC.

SUMMARY

According to some embodiments, a wireless communication device performs a process for initiating a session with a radio network node. As a part of the process, the wireless communication device determines that the radio network node has enabled an access class barring test, determine whether to perform or bypass the access class barring test for the session, and perform or bypass the access class barring test according to the determination.

The wireless communication device may determine to bypass the access class barring test for the session if service specific access control (SSAC) is enabled. In some embodiments, an access class barring (ACB)-bypass variable indicates whether to bypass the access class barring test. In certain embodiments, a lower layer process of the wireless communication device sets the ACB-bypass variable to true in response to receiving a request for SSAC parameters from a higher layer process of the wireless communication device. In certain alternative embodiments, the lower layer process sets the ACB-bypass variable to true in response to receiving an indication from the higher layer process that the session is not barred by SSAC.

The ACB-bypass variable may be set to false after bypassing the access class barring test for the session or in response to expiry of an ACB-bypass timer. In some embodiments, the wireless communication device receives the ACB-bypass timer value from the radio network node.

In some embodiments, the wireless communication device receives an allow bypass indicator from the radio network node and if the allow bypass indicator indicates that bypass is not allowed, the wireless communication device performs the access class barring test.

In some embodiments, a radio network broadcasts an allow bypass indicator that indicates to a wireless communication device that the wireless communication device is allowed to determine whether to perform or bypass an access class barring test when initiating a session. In some embodiments, the radio network node communicates an ACB-bypass timer value to the wireless communication device.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

As described above, existing access barring mechanisms apply two levels of access barring, Service Specific Access Control (SSAC) and Access Class Barring (ACB). This means that a call may pass SSAC only to be barred by ACB. For example, a wireless communication device trying to establish a Voice Over Internet Protocol (VOIP) call may pass the SSAC barring check but may still undergo the general barring of "mobile originating calls" that gets applied to other wireless communication devices performing regular (Internet) data transmission. Existing access barring mechanisms do not provide a consistent way to bar wireless communication devices that are performing normal data access while allowing wireless communication devices that try to establish VOIP calls. A possible way to improve the access barring scheme would be to define additional groups of services and to define corresponding access barring thresholds for those. For example, one could define a group for "Internet access" which could be barred while access for "MMTEL-Voice" would still be permitted. However, this approach adds complexity and may lack flexibility to readily accommodate new services.

Figure 2A:
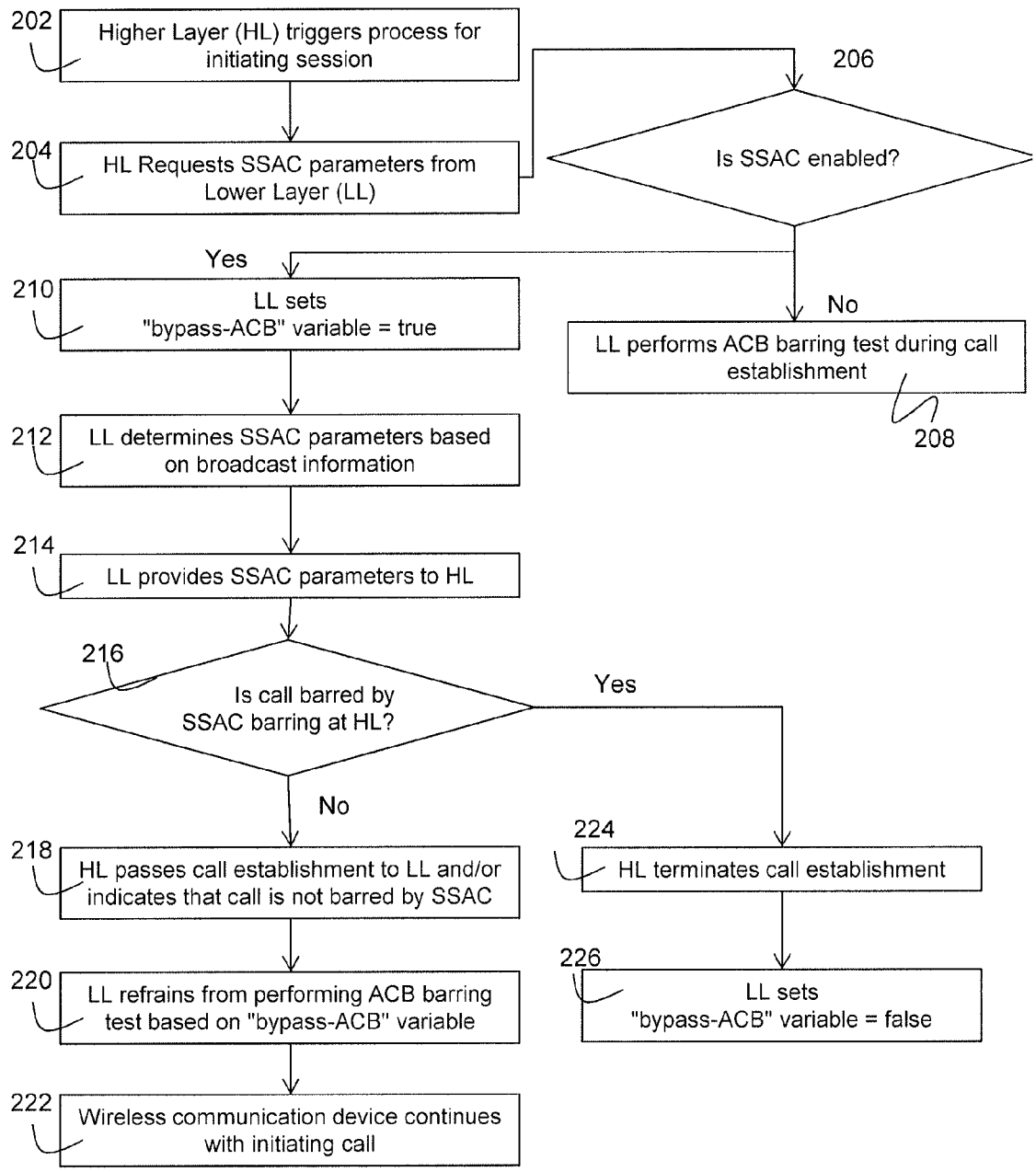
FIGS. 2A-2B show flow diagrams of methods for Inverse SSAC in a wireless communication device according to certain embodiments of the present disclosure.
Figure 2B:
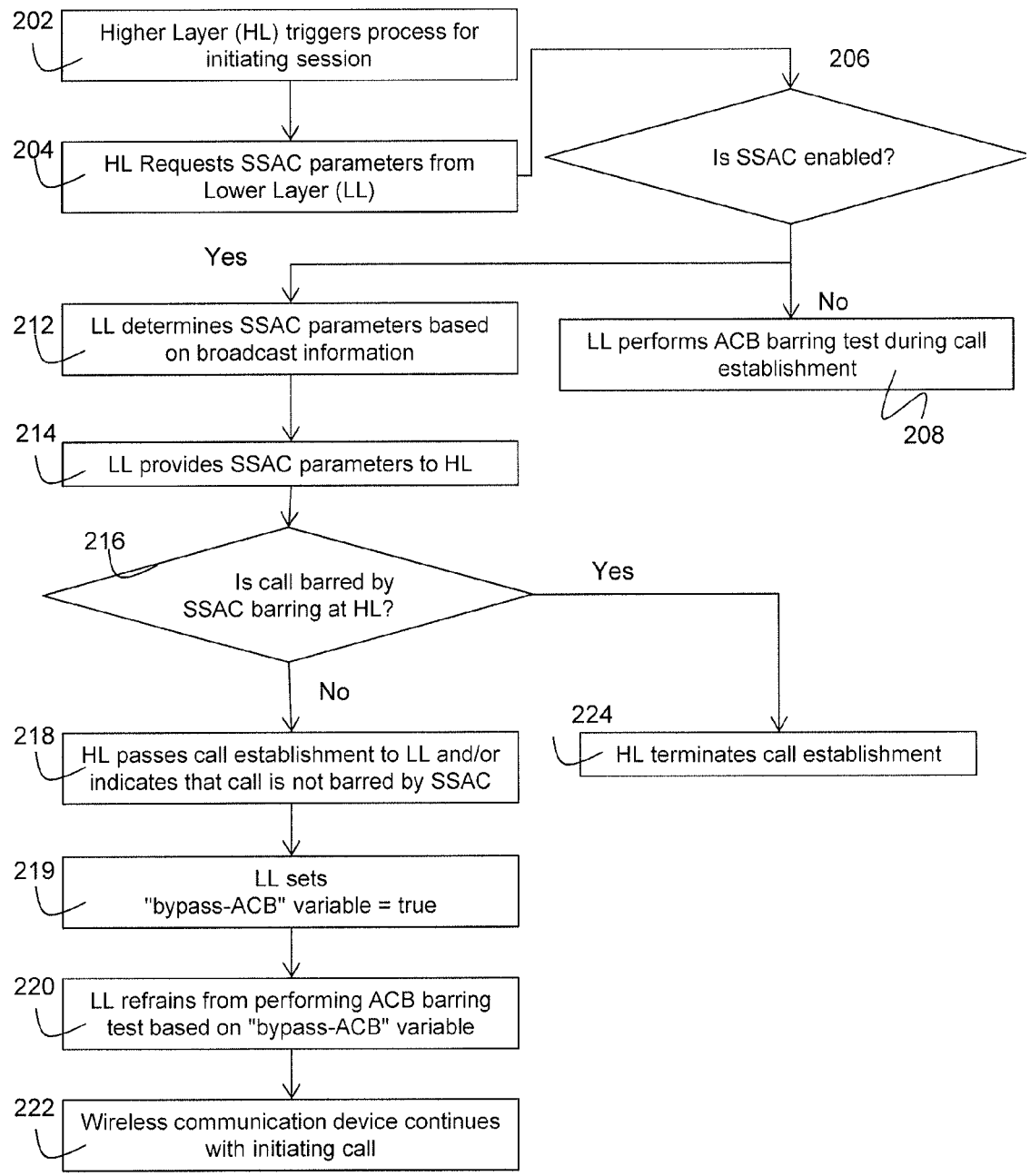

Particular embodiments of the present disclosure relate to an Inverse SSAC procedure that modifies the existing SSAC and ACB features so that voice calls may be prioritized, for example. In general, particular embodiments of the Inverse SSAC procedure inform an Access Stratum layer (such as the RRC layer) that ACB can be bypassed when a higher layer (such as the IMS layer) determines that a wireless communication device is not barred with SSAC. To control bypassing of ACB, a Boolean variable called "bypass-ACB" may be introduced for the RRC layer. The bypass-ACB parameter may be maintained by the wireless communication device. In one embodiment, the bypass-ACB parameter can be changed from FALSE to TRUE when the higher layer initiates the voice call and asks SSAC parameters from the lower layer, an example of which is shown in FIG. 2A. In another embodiment, the bypass-ACB parameter can be changed from FALSE to TRUE when the higher layer finds that the wireless communication device is not barred according to SSAC, an example of which is shown in FIG. 2B. The higher layer may determine whether the wireless communication passes SSAC based on the service requested by the wireless communication device. As an example, voice calls may pass SSAC. All examples presented herein are not limiting and the same mechanism can also be applied to other services, such as IMS video.

The bypass-ACB parameter can be changed from TRUE to FALSE after completing the RRC connection establishment or after a predefined time period has elapsed. In some embodiments, a timer determines how long the wireless communication device is allowed to bypass ACB. The timer may begin at any suitable time, such as when the wireless communication device sets the bypass-ACB variable to true, when the wireless communication device passes the SSAC barring test, or when a lower layer process of the wireless communication device passes SSAC parameters to a higher layer process. The wireless communication device is allowed to bypass ACB while the timer runs. In embodiments where the bypass-ACB variable is set to TRUE prior to performing the SSAC barring test, the timer may be used to ensure that the bypass-ACB variable returns to FALSE even if it is later determined that the call is barred by the SSAC barring test. Returning the bypass-ACB variable to FALSE may prevent a subsequent call from unintentionally bypassing the ACB barring test. If the subsequent call intends to bypass the ACB barring test, the bypass-ACB variable may be set to TRUE during that call.

Figure 1:
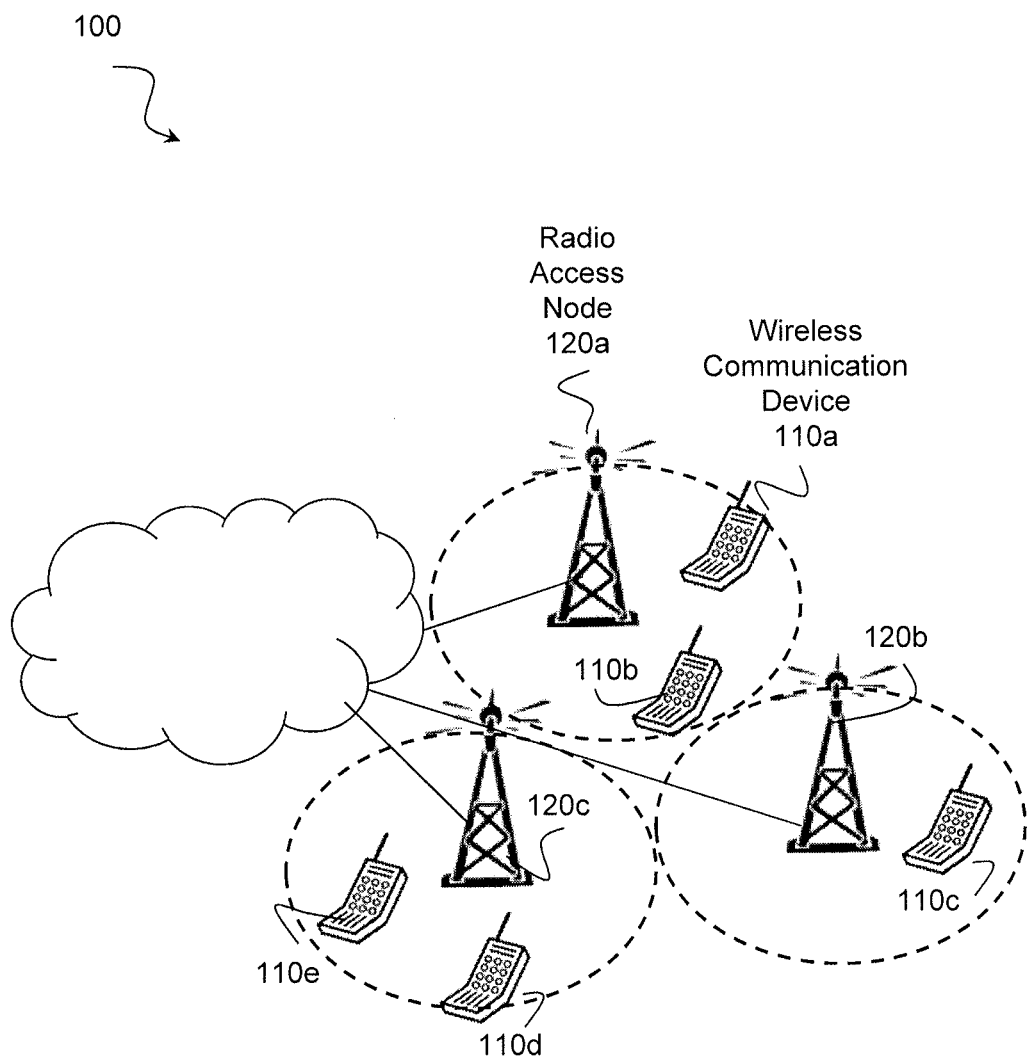
FIG. 1 illustrates a block diagram of a wireless network that may implement an Inverse SSAC procedure according to one embodiment of the present disclosure.

The Inverse SSAC procedure may be implemented in any appropriate type of telecommunication system supporting any suitable communication standards and using any suitable components. As an example, FIG. 1 illustrates a block diagram of a wireless network 100 that may implement the Inverse SSAC procedure according to one embodiment of the present disclosure. Wireless network 100 includes one or more instances of wireless communication devices 110, one or more radio access nodes 120 capable of communicating with these wireless communication devices 110, and any additional elements suitable to support communication between wireless communication devices 110 or between a wireless communication device 110 and another communication device (such as a landline telephone). Examples of wireless communication devices 110 and radio access node 120 are illustrated in greater detail in FIGS. 4A-4B and FIGS. 5A-5B, respectively.

FIGS. 2A and 2B show flow diagrams of methods for Inverse SSAC in a wireless communication device 110 according to certain embodiments of the present disclosure. In the example, certain functionality may be performed by a higher layer (HL), such as an IMS layer, and other functionality may be performed by a lower layer (LL), such as an Access Stratum (AS) layer. The RRC layer is an example of an Access Stratum layer.

In the embodiment of FIG. 2A, the higher layer triggers a process for initiating a telephony communication session at step 202. At step 204, the higher layer requests SSAC parameters from the lower layer. At step 206, the lower layer determines if SSAC is enabled based on broadcast information from radio access node 120. If at step 206 SSAC is not enabled, the lower layer does not set the bypass-ACB variable to true and the method proceeds to step 208 where the call establishment procedure includes applying the ACB barring test if broadcast information from radio network node 120 indicates that ACB is enabled. The call may be terminated if at step 208 the ACB barring test indicates that the access class of wireless communication device 110 is barred.

If at step 206 SSAC is not enabled, the lower layer sets the bypass-ACB to true at step 210. At step 212, the lower layer determines the SSAC parameters based on broadcast information from radio access node 120. At step 214, the lower layer provides the SSAC parameters to the higher layer. At step 216, the higher layer applies SSAC to determine if the call is barred.

If at step 216 the call is not barred, the method proceeds to step 218 where the higher layer passes call establishment to the lower layer and/or the higher layer indicates that the call is not barred based on the SSAC parameters. At step 220, the lower layer proceeds with establishing the call without applying the ACB barring test. As an example, in some embodiments, the lower layer performs an RRC establishment procedure without applying the ACB barring test. At step 222, wireless communication device 110 continues with initiating the call. In certain embodiments, the lower layer may set the bypass ACB variable to false during or after step 220 so that by default the ACB barring test applies in a subsequent call. The procedure may be repeated for the subsequent call to determine whether to set the ACB barring test to true. In certain alternative embodiments, the lower layer may set the bypass ACB variable to false in response to the expiry of an ACB-bypass timer.

If at step 216 the call is barred in the higher layer, the higher layer terminates the call establishment at step 224 and does not pass the call establishment (e.g., the RRC establishment) to the lower layer. The ACB barring test need not be performed in the lower layer because the call has already been terminated in the higher layer. At step 226, the lower layer may set the bypass ACB variable to false so that by default the ACB barring test applies in a subsequent call. The procedure may be repeated for the subsequent call to determine whether to set the ACB barring test to true. The lower layer may set the bypass ACB variable to false in response to the call being terminated (e.g. when the barring check in the higher layer indicates that the call is barred, the higher layer may indicate to the lower layer that the bypass ACB variable should be set to false) or in response to the expiry of an ACB-bypass timer. As an example, when the lower layer sets the bypass-ACB variable to true in Step 210, then wireless communication device 110 may start an ABC-bypass timer, the expiry of which causes the lower layer to set the bypass ACB variable to false. In some embodiments, the ABC-bypass timer length can be configured by the network, for example, with RRC protocol.

As described above, FIG. 2A illustrates an example in which the lower layer sets the bypass-ACB variable prior to the higher layer performing the SSAC barring test. FIG. 2B illustrates an alternative embodiment in which the lower layer sets the bypass-ACB variable after the higher layer performs the SSAC barring test and determines that the call is not barred by SSAC. Like-numbered steps of FIG. 2A and FIG. 2B are analogous. As can be seen, step 210 of FIG. 2A has been omitted from FIG. 2B (the lower layer does not set the bypass-ACB variable to TRUE prior to the higher layer performing the SSAC barring test) and step 219 has been added (the lower layer sets the bypass-ACB variable to TRUE after the higher layer performs the SSAC barring test and determines that the call is not barred by SSAC). In FIG. 2B, step 226 has been omitted because this step is not needed as the bypass-ACB variable was never set to TRUE.

Figure 3A:
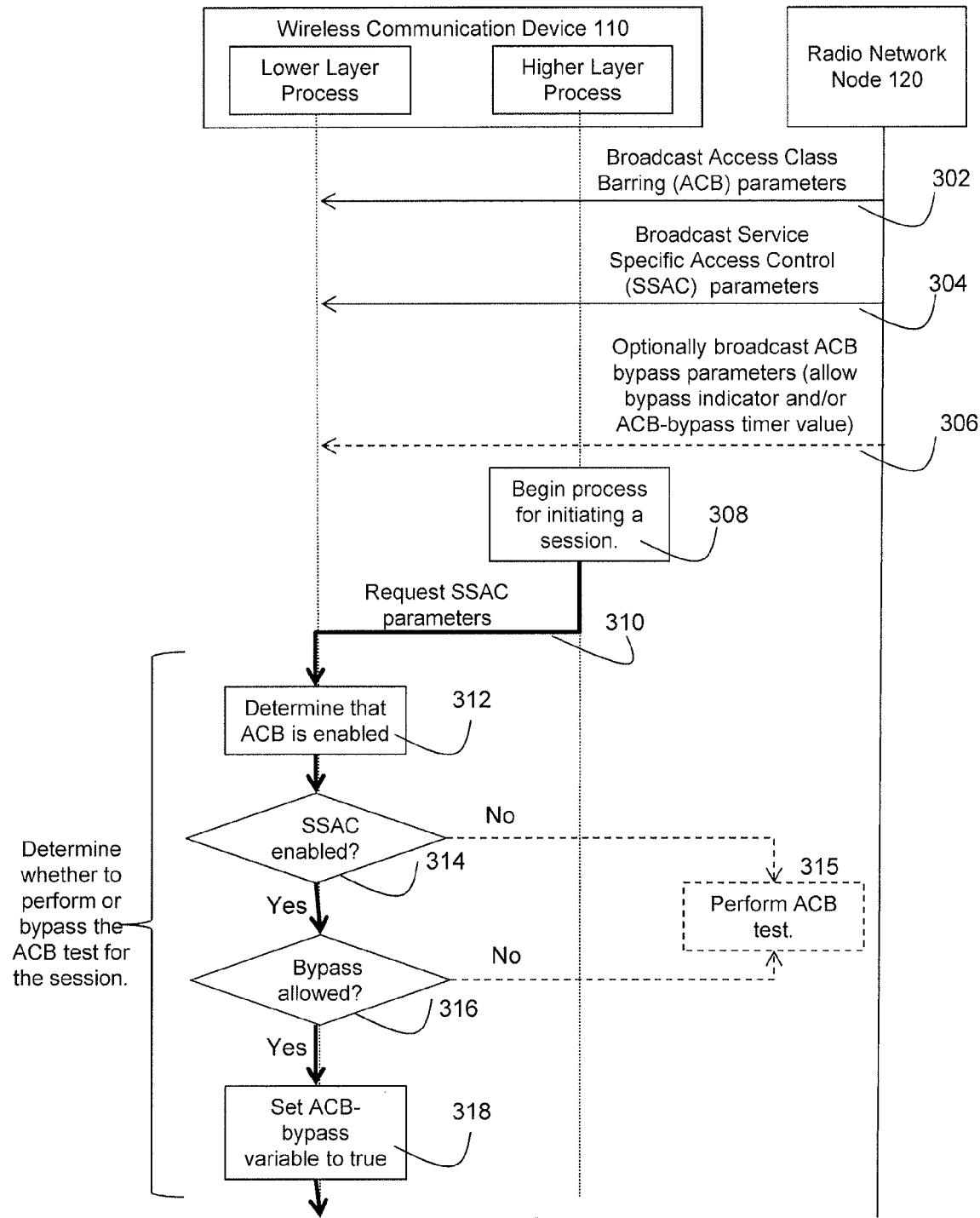
FIGS. 3A-3B show a signal flow of a method for soft lock of a cell in a wireless network according to one embodiment of the present disclosure.
Figure 3B:
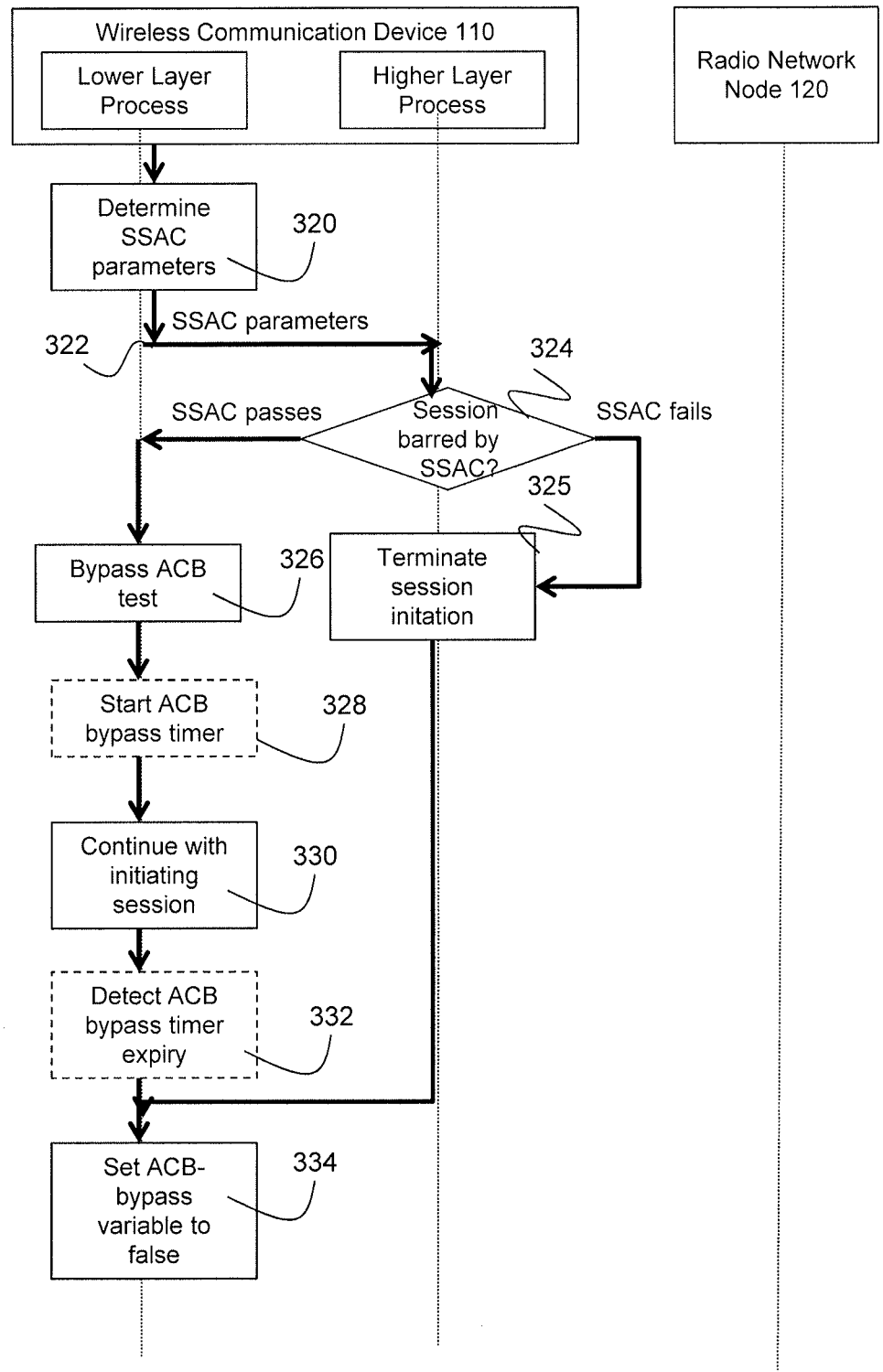

FIGS. 3A-3B show a signal flow of a method for soft lock of a cell in a wireless network according to one embodiment of the present disclosure. In FIGS. 3A-3B, wireless communication node 110 performs a process for initiating a session with radio network node 120. The process performed by wireless device 110 may include a signal exchange between a lower layer process (such as an RRC layer or other access stratum process) and a higher layer process (such as an IMS process) of wireless communication device 110.

At step 302, radio network node 120 broadcasts ACB parameters. The ACB parameters indicate to wireless communication device 110 that radio network node 120 has enabled an access class barring test. The ACB parameters include information for determining the barred access classes. At step 304, radio network node 120 broadcasts SSAC parameters. The SSAC parameters indicate to wireless communication device 120 that radio network node 120 has enabled service specific access control. The SSAC parameters include information for determining the barred services. At step 306, radio network node 120 broadcasts ACB bypass parameters. Broadcasting ACB bypass parameters may be optional depending on the embodiment. In embodiments where radio network node 120 broadcasts the ACB bypass parameters, the parameters may be broadcast at any suitable time, such as in response to enabling ACB or SSAC. The ACB bypass parameters may include an allow bypass indicator and/or an ACB-bypass timer value.

For example, in some embodiments, radio network node 120 may want to control the usage of the inverse SSAC feature. This can be done by broadcasting an allow bypass indicator, such as a single-bit information indicating that the ACB can by bypassed by wireless communication device 110. There are different ways to communicate this. A new bit can be introduced; spare bits can be used so that inverse SSAC can be taken into use without change in the existing structure, such as the ASN.1 structure used for System Information broadcast; a specific combination of current SSAC parameters can be used to indicate allowance to bypass ACB; a code point for the special access classes in the current SSAC parameters can be used as indicator of permission to bypass ACB; permission to bypass ACB can be configured to wireless communication device 110 in a dedicated manner during the initial attachment using NAS signaling or other appropriate signaling; permission to bypass ACB can be limited to the Home PLMN (HPLMN)

only, meaning that when wireless communication device 110 is roaming, bypassing is not allowed.

In addition, in some embodiments the network can control the inverse SSAC feature by selecting an ACB-bypass timer value. Similar to the bit indicating the allowance to use the inverse SSAC feature, the ACB-bypass timer value can be configured with the signaling broadcasted by the network, a default value can be specified, or the value can be configured during the initial attach.

At step 308, wireless communication device 110 begins the process for initiating a session. As an example, wireless communication device 110 may begin the process in response to a user input that requests a voice call or a data call. In some embodiments, the process initiates in the higher layer. The higher layer sends the lower layer a request for SSAC parameters at step 310.

In response, the lower layer may determine whether to perform or bypass the ACB test for the session in steps 312-318. As an example, at step 312 the lower layer determines that radio network node 120 has enabled access class barring. The lower layer makes the determination based on the ACB parameters broadcast by radio network node 120 in step 302. At step 314, the lower layer determines whether radio network node 120 has enabled service specific access control. The lower layer makes the determination based on the SSAC parameters broadcast by the radio network node in step 304. If at step 314 the lower layer determines that SSAC is not enabled, the lower layer proceeds with a call initiation process that includes performing the ACB test at step 315. If at step 314 the lower layer determines that SSAC is enabled, the lower layer proceeds to step 316 to determine whether bypass is allowed. The lower layer makes the determination based on an allow bypass indicator broadcast by radio network node 120 in step 306. If at step 316 the lower layer determines that ACB bypass is not allowed, the lower layer proceeds with a call initiation process that includes performing the ACB test at step 315. If at step 316 the lower layer determines that ACB bypass is allowed, the lower layer proceeds to step 318 to set an ACB-bypass variable to true.

Step 316 may be optional depending on whether radio network node 120 broadcasts an allow bypass indicator. In certain embodiments, such as embodiments where radio network node 120 does not broadcast a bypass indicator, the lower layer may proceed directly from determining that SSAC is enabled (step 314) to setting the ACB-bypass variable to true (step 318).

From step 318, the method proceeds to step 320 where the lower layer determines SSAC parameters based on the information broadcast by radio network node 120 at step 304. At step 322 the lower layer communicates the SSAC parameters to the higher layer. At step 324, the higher layer determines whether the session is barred based on the SSAC parameters. In some embodiments, the SSAC parameters indicate whether to bar a session based on service type. As an example, the SSAC parameters may indicate that voice calls fail SSAC and that regular web traffic passes SSAC as SSAC is not applied to that service type.

If at step 324 the session fails SSAC, the higher layer terminates the process for initiating the session at step 325. The method may then skip to step 334 described below.

If at step 324 the session passes SSAC, the higher layer indicates to the lower layer to continue the process for initiating the session. Based on the ACB-bypass variable being set to true (see step 318), the lower layer bypasses the ACB test at step 326.

In certain embodiments that use an ACB bypass timer, the lower layer may proceed to step 328 to start the ACB bypass timer. The value of the ACB bypass timer may be configured within wireless communication device 110 or received from radio network node 120 (e.g., step 306).

The method proceeds to step 330 where the lower layer continues the process for initiating the session without performing the access class barring test. Step 330 may include any suitable message exchange with radio network node 120 and/or the higher layer process.

In certain embodiments that use an ACB bypass timer, the lower layer detects the expiry of the ACB bypass timer at step 332. In response, the method proceeds to step 334 to set the ACB-bypass variable to false. In certain other embodiments, the lower layer may set the ACB-bypass variable to false based on completing any suitable step of the process, such as in response to completing the bypass at step 326 or in response to establishing the session at step 330. The lower layer sets the ACB-bypass variable to false in preparation for a subsequent session. Thus, by default the ACB barring test applies in the subsequent call. The procedure may be repeated for the subsequent call to determine whether to set the ACB barring test to true.

Although FIG. 3 illustrates the lower layer as setting the ACB bypass variable to TRUE prior to the higher layer performing the SSAC barring test, in certain other embodiments the lower layer sets the ACB bypass variable to TRUE after the higher layer performs the SSAC barring test and determines that the call is not barred by SSAC.

Figure 4A:
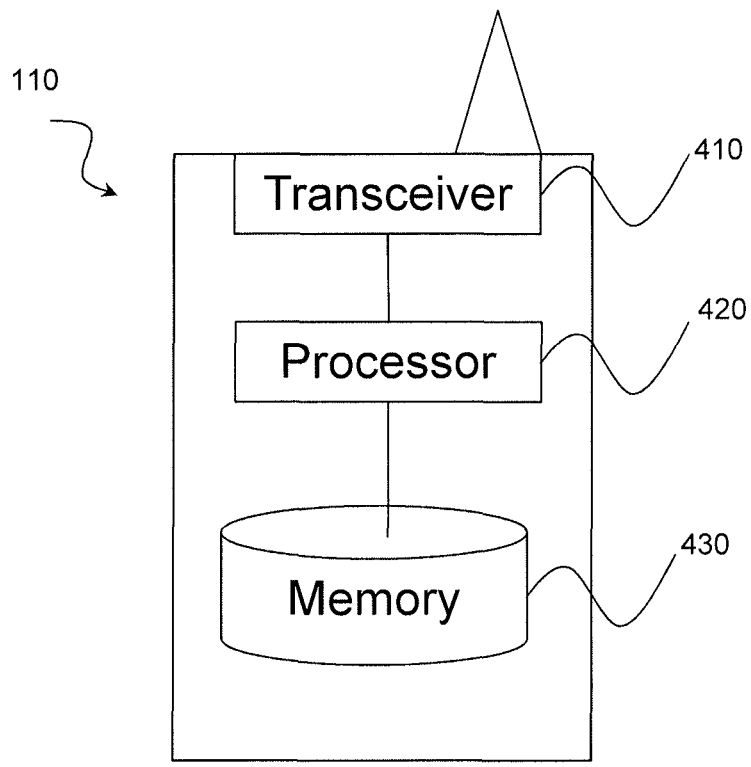
FIGS. 4A-4B illustrate block diagrams of a wireless communication device according to certain embodiments of the present disclosure.

FIG. 4A is a block schematic of a wireless communication device 110 suitably operative in accordance with the principles of the disclosure. Examples of wireless communication device 110 include a mobile phone (e.g., "cellular" phone), a smart phone, a PDA (Personal Digital Assistant), a portable, pocket, or hand-held computer (e.g., laptop, tablet) with wireless capability, a sensor, a modem, a machine type (MTC) device/machine to machine (M2M) device, laptop embedded equipment (LEE), laptop mounted equipment (LME), USB dongles, a device-to-device capable device, a car-mounted mobile device which communicates voice and/or data via radio access network, or any other device that can provide wireless communication. Wireless communication device 110 may also be referred to as a mobile station (MS) or user equipment (UE). Wireless communication device 110 includes transceiver 410, processor 420, and memory 430. In some embodiments, transceiver 410 facilitates transmitting wireless signals to and receiving wireless signals from radio access node 120 (e.g., via an antenna), processor 420 executes instructions to provide some or all of the functionality described herein as provided by a wireless communication device 110, and memory 430 stores the instructions executed by processor 420.

Processor 420 includes any suitable combination of hardware and software implemented in one or more integrated circuits or modules to execute instructions and manipulate data to perform some or all of the described functions of wireless communication device 110. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 4) responsible for providing certain aspects of the mobile device's functionality, including any of the functionality described above and/or any additional functionality (including any functionality necessary to support the solution described above).

Figure 4B:
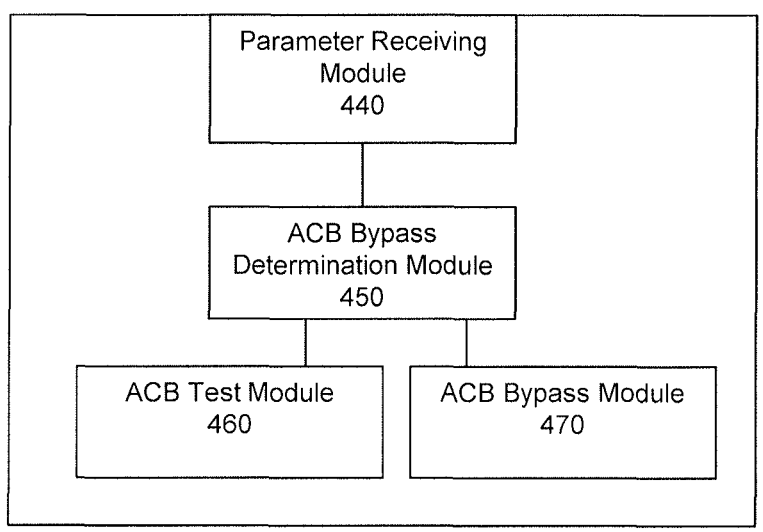

FIG. 4B is a block schematic of a wireless communication device 110 according to certain embodiments. FIG. 4B includes parameter receiving module 440, ACB bypass determination module 450, ACB test module 460, and ACB bypass module 470. Parameter receiving module 440 receives parameters from radio access node 120, such as ACB parameters, SSAC parameters, and/or ACB bypass parameters (e.g., allow bypass indicator and/or ACB-bypass timer value). ACB bypass determination module 450 determines whether to perform or bypass the access class barring test for a session. As an example, in some embodiments ACB bypass determination module 450 performs steps 312-318 of FIG. 3A. Depending on the determination made by determination module 450, ACB test module 460 performs the access class barring test or ACB bypass module 470 bypasses the access class barring test.

Figure 5A:
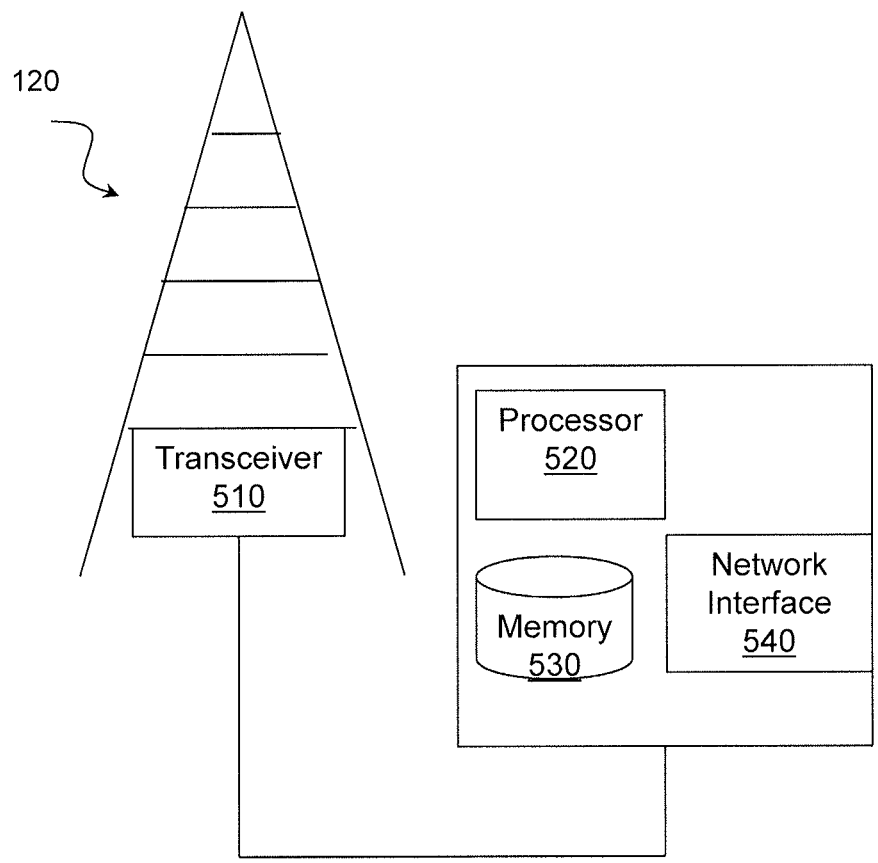
FIGS. 5A-5B illustrate block diagrams of a radio access node according to certain embodiments of the present disclosure.

FIG. 5A is a block schematic of a radio access node 120 suitably operative in accordance with the principles of the disclosure. Radio access node 120 can be, for example, an eNodeB, a node B, a radio base station (RBS), a wireless access point (e.g., a Wi-Fi access point), a low power node, a base transceiver station (BTS), a transmission point or node, or a remote RF unit (RRU). Other network nodes, such as one or more radio network controllers, can be configured between the radio access nodes and the core network. Such other network nodes can include processors, memory, and interfaces similar to those described with respect to FIG. 5; such other network nodes, however, might not necessarily include a wireless interface, such as transceiver 510.

Radio access node 120 includes at least one processor 520, at least one memory 530, and at least one network interface 540; in certain embodiments, radio access node 120 can also include a transceiver 510. Transceiver 510 facilitates transmitting wireless signals to and receiving wireless signals from wireless communication device 110 (e.g., via an antenna); processor 520 executes instructions to provide some or all of the functionality described above as being provided by a radio access node 120; memory 530 stores the instructions executed by processor 520; and network interface 540 communicates signals to backend network components, such as a gateway, switch, router, Internet, Public Switched Telephone Network (PSTN), other radio network nodes 120, and/or core network nodes. Processor 520 and memory 530 can be of the same types as described supra with respect to FIG. 4.

In some embodiments, network interface 540 is communicatively coupled to processor 520 and refers to any suitable device operable to receive input for radio access node 120, send output from radio access node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

Other embodiments of radio access node 120 include additional components (beyond those shown in FIG. 5) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 5B:
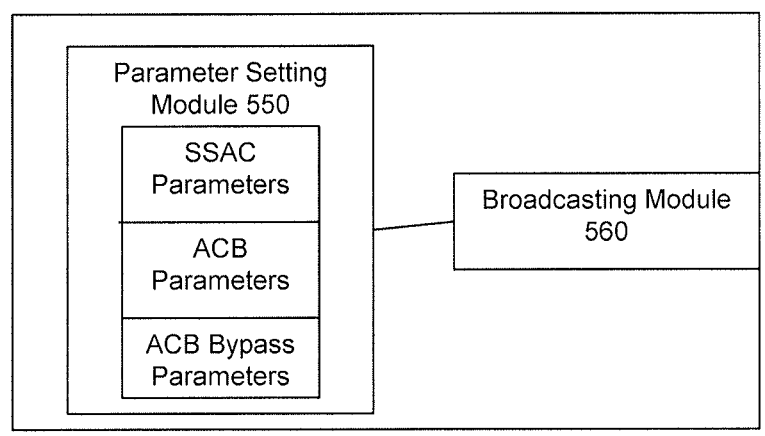

FIG. 5B is a block schematic of a radio access node 120 according to certain embodiments. FIG. 5B includes parameter setting module 550 and broadcasting module 560. Parameter setting module 550 sets SSAC parameters, ACB parameters, and/or ACB bypass parameters (e.g., allow bypass indicator and/or ACB-bypass timer value). Broadcasting module 560 broadcasts the SSAC parameters, ACB parameters, and/or ACB bypass parameters to wireless communication devices 110 within coverage of radio access node 120.

Some embodiments of the disclosure may provide one or more technical advantages. A technical advantage of certain embodiments uses ACB to block less important traffic, such as regular web traffic, and to allow important traffic, such as VOIP calls or higher priority data or traffic from premium subscribers, during the times that the mobile broadband network is highly loaded or otherwise unable to admit all wireless communication devices and maintain the expected Quality of Service (QoS). Some embodiments may benefit from some, none, or all of the advantages. Other technical advantages may be readily ascertained by one of ordinary skill in the art.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the disclosure. The methods may include more, fewer, or other steps. Additionally, steps may be performed in any suitable order, and certain steps may be performed either sequentially or in parallel.

Although this disclosure has been described in terms of certain embodiments, alterations and permutations of the embodiments will be apparent to those skilled in the art. As an example, although certain examples have been described in the context of long term evolution (LTE), other embodiments may use LTE-Advanced, UMTS, HSPA, GSM, cdma2000, WiMax, WiFi, and/or other suitable radio access technology or combination of radio access technologies.

The above description of the embodiments does not constrain this disclosure. Other changes, substitutions, and alterations are possible without departing from the spirit and scope of this disclosure, as defined by the following claims.

The invention claimed is:

1. A wireless communication device operable to perform a process for initiating a session with a radio network node, wherein as a part of the process the wireless communication device is operable to:
   determine that the radio network node has enabled an access class barring test;
   receive an allow bypass indicator from the radio network node;
   determine whether to perform or bypass the access class barring test for the session; and perform or bypass the access class barring test according to the determination, wherein:
in response to service specific access control (SSAC) being enabled and the allow bypass indicator indicating that bypass is not allowed, the wireless communication device determines not to bypass the access class barring test for the session; and in response to the service specific access control (SSAC) being enabled and the allow bypass indicator indicating that bypass is allowed, the wireless communication device determines to bypass the access class barring test for the session.

2. The wireless communication device of claim 1, wherein a lower layer process of the wireless communication device sets an access class barring (ACB)-bypass variable to true in response to receiving a request for service specific access control (SSAC) parameters from a higher layer process of the wireless communication device.

3. The wireless communication device of claim 1, wherein the wireless communication device sets an access class barring (ACB)-bypass variable to true upon a determination to bypass the access class barring test for the session.

4. The wireless communication device of claim 3, wherein after bypassing the access class barring test for the session, the wireless communication device is further operable to set the ACB-bypass variable to false in preparation for a subsequent session.

5. The wireless communication device of claim 1, wherein the wireless communication device sets an access class barring (ACB)-bypass variable to true upon a determination to bypass the access class barring test for the session and sets the ACB-bypass variable to false in response to expiry of an ACB-bypass timer.

6. The wireless communication device of claim 5, wherein the wireless communication device receives the ACB-bypass timer value from the radio network node.

7. The wireless communication device of claim 1, wherein the process for initiating the session comprises a lower layer process and a higher layer process and:
in response to determining that the radio network node has enabled service specific access control (SSAC) and that higher layer has requested SSAC parameters from the lower layer, the lower layer process sets an access class barring (ACB)-bypass variable to true;
the lower layer provides SSAC parameters to the higher layer;
the higher layer determines whether the session is barred based on the SSAC parameters;
if the session is barred based on the SSAC parameters, the higher layer terminates the process for initiating the session; and
if the session is not barred based on the SSAC parameters, the higher layer indicates to the lower layer to continue the process for initiating the session and, based on the ACB-bypass variable, the lower layer continues the process for initiating the session without performing the access class barring test.

8. The wireless communication device of claim 1, wherein the process for initiating the session comprises a lower layer process and a higher layer process and:
when service specific access control (SSAC) is enabled, the higher layer determines whether the session is barred based on SSAC parameters;

if the session is barred based on the SSAC parameters, the higher layer terminates the process for initiating the session; and if the session is not barred based on the SSAC parameters, the higher layer indicates this to the lower layer and the lower layer sets an access class barring (ACB)-bypass variable to true; wherein, based on the ACB-bypass variable, the lower layer continues the process for initiating the session without performing the access class barring test.

9. The wireless communication device of claim 1, wherein the wireless communication device comprises one or more processors and memory, the memory containing instructions executable by the one or more processors.

10. A radio network node operable to:
broadcast an allow bypass indicator, the allow bypass indicator indicating to a wireless communication device if, when initiating a session, the wireless communication device is allowed to determine whether to perform or bypass an access class barring test,
wherein the radio network node configures the allow bypass indicator in connection with enabling service specific access control (SSAC), and
in response to the service specific access control (SSAC) being enabled and the allow bypass indicator indicating that bypass is not allowed, the access class barring test is not bypassed by the wireless communication device; and
in response to the service specific access control (SSAC) being enabled and the allow bypass indicator indicating that bypass is allowed, the access class barring test is bypassed by the wireless communication device.

11. The radio network node of claim 10, the radio network node further operable to communicate an ACB-bypass timer value to the wireless communication device.

12. The radio network node of claim 10, wherein the radio network node comprises one or more processors and memory, the memory containing instructions executable by the one or more processors.

13. A method in a wireless communication device for initiating a session with a radio network node, comprising:
determining that the radio network node has enabled an access class barring test;
receiving an allow bypass indicator from the radio network node;
determining whether to perform or bypass the access class barring test for the session; and
performing or bypassing the access class barring test according to the determination,
wherein:
in response to service specific access control (SSAC) being enabled and the allow bypass indicator indicating that bypass is not allowed, the access class barring test is not bypassed; and
in response to the service specific access control (SSAC) being enabled and the allow bypass indicator indicating that bypass is allowed, the access class barring test is bypassed.

14. The method of claim 13, further comprising setting an access class barring (ACB)-bypass variable to true in a lower layer process in response to receiving a request for service specific access control (SSAC) parameters from a higher layer process.

15. The method of claim 13, further comprising setting an access class barring (ACB)-bypass variable to true upon a determination to bypass the access class barring test for the session.

16. The method of claim 15, wherein after bypassing the access class barring test for the session, the method further comprises setting the ACB-bypass variable to false in preparation for a subsequent session.

17. The method of claim 13, further comprising setting an access class barring (ACB)-bypass variable to true upon a determination to bypass the access class barring test for the session and setting the ACB-bypass variable to false in response to expiry of an ACB-bypass timer.

18. The method of claim 17, further comprising receiving the ACB-bypass timer value from the radio network node.

19. The method of claim 13, further comprising:
- setting, by a lower layer, an access class barring (ACB)-bypass variable to true in response to determining that the radio network node has enabled service specific access control (SSAC) and that a higher layer has requested SSAC parameters from the lower layer;
- providing the SSAC parameters from the lower layer to the higher layer;
- determining, by the higher layer, whether the session is barred based on the SSAC parameters;
- if the session is barred based on the SSAC parameters, terminating the process for initiating the session by the higher layer; and
- if the session is not barred based on the SSAC parameters, indicating from the higher layer to the lower layer to continue the process for initiating the session and, based on the ACB-bypass variable, continuing the process for initiating the session in the lower layer without performing the access class barring test.

20. The method of claim 13, further comprising:

when service specific access control (SSAC) is enabled, determining, by a higher layer, whether the session is barred based on SSAC parameters;

if the session is barred based on the SSAC parameters, terminating, by the higher layer, the process for initiating the session; and if the session is not barred based on the SSAC parameters, indicating this from the higher layer to the lower layer and setting an access class barring (ACB)-bypass variable to true in the lower layer; wherein, based on the ACB-bypass variable, the lower layer continues the process for initiating the session without performing the access class barring test.

* * * * *